United States Patent
Sasaki

(10) Patent No.: US 12,286,073 B2
(45) Date of Patent: Apr. 29, 2025

(54) FILTER UNIT FOR GAS GENERATOR, GAS GENERATOR, AND METHOD FOR MANUFACTURING GAS GENERATOR

(71) Applicant: Daicel Corporation, Osaka (JP)

(72) Inventor: Tomoya Sasaki, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 18/660,252

(22) Filed: May 10, 2024

(65) Prior Publication Data
US 2024/0286575 A1 Aug. 29, 2024

Related U.S. Application Data

(63) Continuation of application No. PCT/JP2022/024335, filed on Jun. 17, 2022.

(30) Foreign Application Priority Data

Nov. 12, 2021 (JP) ................................ 2021-185185

(51) Int. Cl.
*B60R 21/264* (2006.01)
*B01D 39/12* (2006.01)
(Continued)

(52) U.S. Cl.
CPC .......... *B60R 21/2644* (2013.01); *B01D 39/12* (2013.01); *B01D 46/0005* (2013.01);
(Continued)

(58) Field of Classification Search
CPC ....... B60R 21/2644; B60R 2021/26011; B60R 21/264; B01D 39/12; B01D 46/0005; B01D 46/24; B01D 2279/10; B01D 46/2403
(Continued)

(56) References Cited

U.S. PATENT DOCUMENTS 6,491,321 B1 * 12/2002 Nakashima ........ B01D 46/4218
280/736
6,908,104 B2 * 6/2005 Canterberry ........ B60R 21/2644
280/736
(Continued)

FOREIGN PATENT DOCUMENTS

| JP | 2002046569 A | 2/2002 |
| JP | 2009286217 A | 12/2009 |
| JP | 2012076608 A | 4/2012 |

OTHER PUBLICATIONS

International Search Report and Written Opinion mailed on Jul. 26, 2022, received for PCT Application PCT/JP2022/024335, filed on Jun. 17, 2022, 11 pages including English Translation.

*Primary Examiner* — Paul N Dickson
*Assistant Examiner* — Caitlin Anne Miller
(74) *Attorney, Agent, or Firm* — XSENSUS LLP

(57) ABSTRACT

A filter unit for a gas generator includes a filter and a filter housing coaxially positioning and fixing the filter in a filter accommodating space. The filter housing includes a first restraining end part disposed as a closing surface at one end of the filter housing and restraining a one axial end surface of the filter, a second restraining end part disposed at an other end of the filter housing, surrounding a gas inflow port, and restraining an other axial end surface of the filter, and a peripheral wall part connecting the first restraining end part and the second restraining end part and including a gas discharge port. The peripheral wall part includes a restraining peripheral wall part restraining a peripheral surface of the filter, and a non-restraining peripheral wall part in which the gas discharge port is disposed.

10 Claims, 6 Drawing Sheets

(51) Int. Cl.
*B01D 46/00* (2022.01)
*B01D 46/24* (2006.01)
*B60R 21/26* (2011.01)

(52) U.S. Cl.
CPC .......... *B01D 46/24* (2013.01); *B01D 2279/10* (2013.01); *B60R 2021/26011* (2013.01)

(58) Field of Classification Search
USPC ........................................................ 280/741
See application file for complete search history.

(56) References Cited

U.S. PATENT DOCUMENTS

| | | | | |
|---|---|---|---|---|
| 8,521,201 | B2* | 8/2013 | Qiu | H04W 16/10 455/507 |
| 8,667,897 | B2* | 3/2014 | Nakayasu | B60R 21/272 102/530 |
| 10,696,267 | B2* | 6/2020 | Fukumoto | B60R 21/2644 |
| 2012/0079958 | A1 | 4/2012 | Nakayasu | |
| 2024/0239723 | A1* | 7/2024 | Sasaki | B60R 21/261 |
| 2024/0294138 | A1* | 9/2024 | Fukushima | B60R 21/2644 |

\* cited by examiner

FILTER UNIT FOR GAS GENERATOR, GAS GENERATOR, AND METHOD FOR MANUFACTURING GAS GENERATOR

TECHNICAL FIELD

The present invention relates to a filter unit for a gas generator, a gas generator, and a method for manufacturing a gas generator.

BACKGROUND ART

There is a known gas generator having a long tubular shape and including a combustion chamber housing unit that accommodates a gas generating agent and a filter housing that accommodates a filter and is attached to one end side of the combustion chamber housing unit (see, for example, Patent Document 1). The combustion chamber housing unit has a combustion chamber housing made of metal having a long tubular shape, for example. A combustion chamber accommodating the gas generating agent is formed inside the combustion chamber housing unit. For example, an igniter for igniting the gas generating agent accommodated in the combustion chamber is attached to another end side of the combustion chamber housing.

Typically, a gas discharge port for discharging the combustion gas generated by combustion of the gas generating agent to the outside is formed in the filter housing. The combustion gas generated in the combustion chamber housing unit is cooled by passing through the filter before being discharged to the outside from the gas discharge port, and slag (residue) and the like contained in the combustion gas are filtered by the filter.

CITATION LIST

Patent Document

Patent Document 1: U.S. Pat. No. 6,908,104

SUMMARY OF INVENTION

Technical Problem

In the gas generator disclosed in FIG. 1 and the like of Patent Document 1, a filter housing 51 for accommodating a filter 37 is attached to a container 41 accommodating a gas generating agent 52. However, in a known filter unit for a gas generator, the filter 37 accommodated in the filter housing 51 is positioned only after the filter housing 51 is attached to the container 41. Therefore, in a state before the filter housing 51 is attached to the container 41, the filter 37 is not fixed in the filter housing 51 and the filter 37 and the filter housing 51 are not unitized. As a result, in the manufacturing process of the gas generator, the filter 37 is likely to fall off from the filter housing 51, which makes the gas generator difficult to handle.

The technology of an embodiment of the present disclosure has been made in view of the above circumstances, and an object thereof is to provide a technology related to a filter unit for a gas generator suitable for manufacturing a gas generator.

Solution to Problem

A filter unit for a gas generator according to an embodiment of the present disclosure for solving the above problem includes: a filter having a columnar outer shape; and a filter housing accommodating the filter in a filter accommodating space formed inside the filter housing, the filter being accommodated in a coaxially positioned and fixed state, in which the filter housing includes a first restraining end part disposed as a closing surface at one end of the filter housing and restraining a one axial end surface of the filter, a second restraining end part disposed at an other end of the filter housing, surrounding a gas inflow port, and restraining an other axial end surface of the filter, and a peripheral wall part connecting the first restraining end part and the second restraining end part and including a gas discharge port, the first restraining end part, the second restraining end part, and the peripheral wall part being integrally formed, and the peripheral wall part includes a restraining peripheral wall part restraining a peripheral surface of the filter, and a non-restraining peripheral wall part in which the gas discharge port is disposed, the non-restraining peripheral wall part being disposed apart from the peripheral surface of the filter thereby forming an annular gap between the non-restraining peripheral wall part and the peripheral surface of the filter.

Here, the second restraining end part may be formed by an annular flange in which an end part of the peripheral wall part is folded toward the filter accommodating space.

The peripheral wall part may include a small diameter part and a large diameter part having an outer diameter larger than an outer diameter of the small diameter part, the restraining peripheral wall part may be formed by the small diameter part, and the non-restraining peripheral wall part may be formed by the large diameter part.

The restraining peripheral wall part may be formed on both of one end side and an other end side of the peripheral wall part in an axial direction of the peripheral wall part, and the non-restraining peripheral wall part may be formed between a pair of the restraining peripheral wall parts.

The filter may have a cylindrical shape in which a hollow part is formed along an axial direction, and the second restraining end part may cover an entirety of an end surface of the filter.

The filter may have a cylindrical shape in which a hollow part is formed along an axial direction, and a diameter of the gas inflow port may be equal to an inner diameter of the filter or smaller than the inner diameter of the filter.

A plurality of the gas discharge ports may be formed in the peripheral wall part, and a total opening area of the plurality of gas discharge ports may be larger than an opening area of the gas inflow port.

The technology according to an embodiment of the present disclosure can also be specified as a gas generator. That is, a gas generator according to an embodiment of the present disclosure includes: a combustion chamber housing unit including a combustion chamber housing having a tubular shape in which a combustion chamber accommodating a gas generating agent is formed, and an igniter attached to the combustion chamber housing; and the filter unit for a gas generator of any of the above, attached to one end of the combustion chamber housing, in which the gas inflow port of the filter housing is disposed facing the combustion chamber.

A gas generator according to an embodiment of the present disclosure may include: a combustion chamber housing unit including a combustion chamber housing having a tubular shape in which a combustion chamber accommodating a gas generating agent is formed, and an igniter attached to the combustion chamber housing; and the filter unit for a gas generator, attached to one end of the combustion chamber housing, in which the filter housing may include an annular stepped part between the small diameter part and the large diameter part, and in the filter housing, the small diameter part may be inserted into one end of the combustion chamber housing with the gas inflow port facing the combustion chamber, and the annular stepped part may abut against an open end surface on one end side of the combustion chamber housing.

The technology according to an embodiment of the present disclosure can also be specified as a method for manufacturing the gas generator. A method for manufacturing a gas generator according to an embodiment of the present disclosure includes: preparing a filter unit for a gas generator, the filter unit including a filter having a columnar outer shape, and a filter housing accommodating the filter in a filter accommodating space formed inside the filter housing, the filter being accommodated in a coaxially positioned and fixed state; preparing a combustion chamber housing unit including a combustion chamber housing having a tubular shape in which a combustion chamber accommodating a gas generating agent is formed and an igniter attached to the combustion chamber housing; and attaching the filter unit for a gas generator to one end of the combustion chamber housing, in which the filter housing includes a first restraining end part, a second restraining end part, and a peripheral wall part connecting the first restraining end part and the second restraining end part, the first restraining end part, the second restraining end part, and the peripheral wall part being integrally formed, the peripheral wall part includes a non-restraining peripheral wall part in which a gas discharge port is disposed and a restraining peripheral wall part restraining a peripheral surface of the filter, and when the filter unit for a gas generator is prepared, a one axial end surface of the filter is restrained by disposing the first restraining end part as a closing surface at one end of the filter housing, an other axial end surface of the filter is restrained by disposing the second restraining end part at an other end of the filter housing, surrounding a gas inflow port, the non-restraining peripheral wall part is disposed apart from the peripheral surface of the filter thereby forming an annular gap between the non-restraining peripheral wall part and the peripheral surface of the filter, and the peripheral surface of the filter is restrained by the restraining peripheral wall part.

Advantageous Effects of Invention

According to an embodiment of the present disclosure, it is possible to provide a technology related to a filter unit for a gas generator suitable for manufacturing a gas generator.

DESCRIPTION OF EMBODIMENTS

Embodiments according to the present disclosure will be described below with reference to the accompanying drawings. Note that each of the configurations, combinations thereof, and the like in the embodiments are an example, and various additions, omissions, substitutions, and other changes of the configurations may be made as appropriate without departing from the spirit of the present disclosure. The present disclosure is not limited by the embodiments and is limited only by the claims.

First Embodiment

Figure 1:
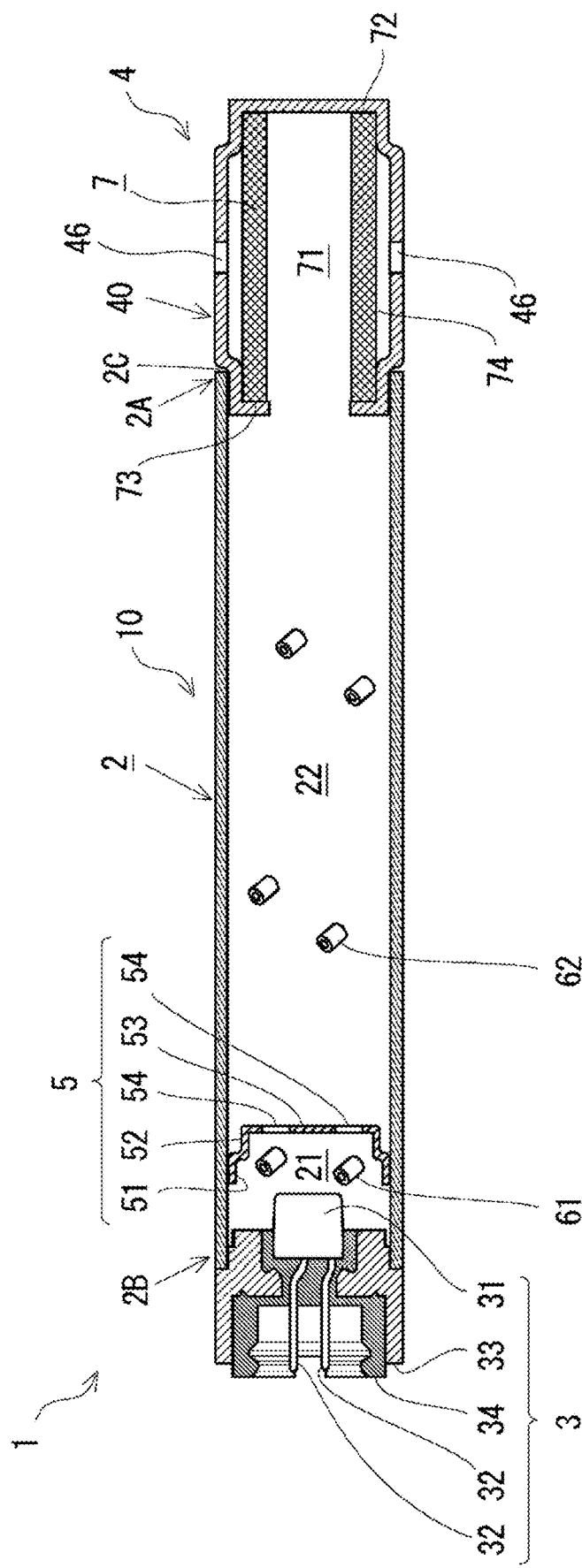
FIG. 1 is a schematic cross-sectional view in an axial direction illustrating an example of a gas generator according to a first embodiment.

FIG. 1 is a schematic cross-sectional view in the axial direction illustrating an example of a gas generator according to the first embodiment. A gas generator 1 can be used as a gas generation device for inflating an airbag, for example. The gas generator 1 of FIG. 1 includes a combustion chamber housing unit 10 and a filter unit 4 (filter unit for a gas generator) integrally attached to the combustion chamber housing unit 10.

The combustion chamber housing unit 10 includes a combustion chamber housing 2 having a tubular shape, and the filter unit 4 is attached to one end side of the combustion chamber housing 2 in the axial direction. An igniter 3 is attached to the other end side of the combustion chamber housing 2 in the axial direction. Hereinafter, of the combustion chamber housing 2, an end part to which the filter unit 4 is attached is called a first end part 2A, and an end part to which the igniter 3 is attached is called a second end part 2B. The first end part 2A and the second end part 2B in the combustion chamber housing 2 are open ends, and these ends are closed by the filter unit 4 and the igniter 3. The combustion chamber housing 2 may be made of metal. Reference sign 2C denotes an open end surface of the first end part 2A in the combustion chamber housing 2.

The igniter 3 is, for example, an electric ignition type igniter, and one used for a known gas generator can be adopted. For example, the igniter 3 includes a cup body 31 made of metal, which accommodating an ignition charge and is sealed, and a pair of electro-conductive pins 32 and 32 for receiving supply of an external current. These components are fixed via a resin member 34 to an igniter holding part 33 made of metal. The igniter holding part 33 of the igniter 3 may be welded to an opening on the other end side of the combustion chamber housing 2 in the axial direction, for example. In this case, the igniter holding part 33 may be joined to the opening of the combustion chamber housing 2 by full circumference welding, whereby welding can be performed airtightly.

A partition wall (retainer) 5 having a cup shape is disposed away from the igniter 3 inside the combustion chamber housing 2 by a predetermined distance. As illustrated in FIG. 1, the partition wall 5 is disposed at an area near the second end part 2B in the combustion chamber housing 2.

In the example illustrated in FIG. 1, the partition wall 5 has a stepped bottomed cylindrical shape as a whole. A side part of the partition wall 5 includes a large diameter part 51 having a relatively large diameter and a small diameter part 52 having a small diameter, and a bottom part 53 is connected to the small diameter part 52. For example, the outer diameter of the partition wall 5 at the large diameter part 51 is substantially identical to the inner diameter of the combustion chamber housing 2, and the large diameter part 51 is fixed to the inner peripheral surface of the combustion chamber housing 2. The large diameter part 51 of the partition wall 5 may be welded to the inner peripheral surface of the combustion chamber housing 2 or may be fixed by another method. At least one or more communication holes 54 having an arbitrary shape are formed in the bottom part 53 of the partition wall 5 and thus the communication holes 54 penetrate the bottom part 53.

The partition wall 5 disposed as described above partitions the inside of the combustion chamber housing 2 into a transfer chamber (enhancer chamber) 21 and a combustion chamber 22. Inside the combustion chamber housing 2, the transfer chamber 21 is formed between the igniter 3 and the partition wall 5, and the combustion chamber 22 is formed between the partition wall 5 and the filter unit 4. As illustrated in FIG. 1, the cup body 31 of the igniter 3 is disposed facing the inside of the transfer chamber 21.

The transfer chamber 21 formed inside the combustion chamber housing 2 accommodates a transfer charge (enhancer agent) 61. The combustion chamber 22 accommodates a gas generating agent 62. The transfer charge 61 and the gas generating agent 62 are not particularly limited, and various ones applied to a known gas generator can be used. The transfer charge 61 and the gas generating agent 62 have a known composition, such as being formed of guanidine nitrate (41 wt. %), basic copper nitrate (49 wt. %), a binder, and additives. As the individual shape of the transfer charge 61 and the gas generating agent 62, for example, a pellet shape, a disk shape, a columnar shape, or a single hole columnar shape having a through hole can be used. The transfer charge 61 and the gas generating agent 62 may be gas generating agents of the same type, the same shape, and the same dimensions, or may be gas generating agents of different types, different shapes, and different dimensions. Note that the transfer charge 61 need not be filled in the transfer chamber 21, and the gas generating agent 62 in the combustion chamber 22 may be directly ignited using the igniter 3. The partition wall 5 need not be installed inside the combustion chamber housing 2.

A connector (not illustrated) is connected to the pair of electro-conductive pins 32 and 32 in the igniter 3 in a state where the gas generator 1 is attached to an airbag device of a vehicle, for example, and power can be supplied from the connector to the igniter 3. The structure of the filter unit 4 will be described later. For example, when a sensor (not illustrated) in the airbag device senses an impact caused by collision of a vehicle or the like, an ignition current is supplied to the pair of electro-conductive pins 32 and 32, and the igniter 3 is operated. Then, the ignition charge accommodated in the cup body 31 in the igniter 3 combusts, thereby generating a flame, high temperature gas, and the like, which are combustion products. Then, the internal pressure of the cup body 31 increases with the combustion of the ignition charge and the cup body ruptures, whereby the flame, the high temperature gas, or the like are released from the ruptured part of the cup body to the transfer chamber 21. As a result, the transfer charge 61 accommodated in the transfer chamber 21 is ignited, and a combustion gas as a combustion product is generated by the combustion of the transfer charge 61.

As described above, the communication hole 54 is formed in the bottom part 53 of the partition wall 5. Therefore, the combustion gas of the transfer charge 61 flows into the combustion chamber 22 through the communication hole 54 of the partition wall 5. As a result, the gas generating agent 62 accommodated in the combustion chamber 22 is ignited, and a combustion gas is generated by the combustion of the gas generating agent 62. The combustion gas generated by the combustion of the gas generating agent 62 passes through a filter 7 of the filter unit 4 attached to the first end part 2A of the combustion chamber housing 2, and is then discharged to the outside from a gas discharge port 46. The filter 7 cools the combustion gas of the gas generating agent 62 and filters slag (residue) and the like contained in the combustion gas.

Figure 2:
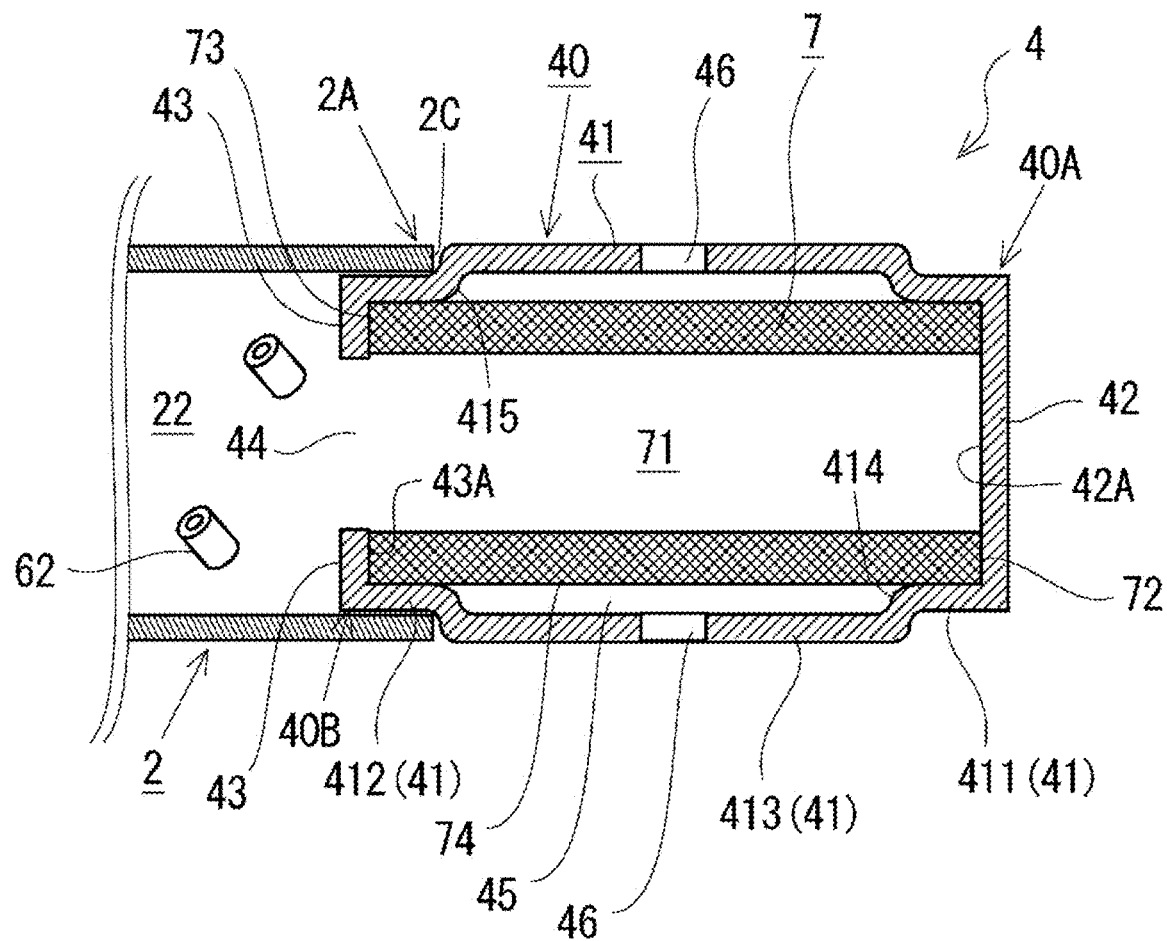
FIG. 2 is a diagram illustrating a detailed structure of a filter unit.

Details of the filter unit 4 will be described below. FIG. 2 is a diagram illustrating a detailed structure of the filter unit 4. The filter unit 4 includes the filter 7 having a columnar outer shape and a filter housing 40 accommodating the filter 7. The filter housing 40 is a bottomed tubular (cup shaped) member to be attached to and thus close an opening (open end) of the first end part 2A in the combustion chamber housing 2. A filter accommodating space for accommodating the filter 7 is formed inside the filter housing 40. The filter housing 40 accommodates the filter 7 inside the filter housing 40 (filter accommodating space), the filter 7 being accommodated in a coaxially positioned and fixed state.

In the example illustrated in FIG. 2, the filter 7 has a cylindrical shape. A hollow part 71 is formed extending through the filter 7 along the axial direction. However, the filter 7 need not have a cylindrical shape and may have another shape. Further, the filter 7 need not include the hollow part 71, and may be a solid filter member.

Reference sign 72 in the figures denotes a first end surface (one axial end surface) positioned on one end side of the filter 7 in the axial direction. Reference sign 73 denotes a second end surface (other axial end surface) positioned on the other end side of the filter 7 in the axial direction. Reference sign 74 denotes an outer peripheral surface of the filter 7. The filter 7 may be formed of a metal wire material. For example, the filter 7 may be produced by accommodating a flat knitted metal wire material in a molding die and compressing and forming the wire material into a cylindrical shape. The filter 7 may be formed into a cylindrical shape by winding a metal wire material around a rod-shaped core material a plurality of times and then pulling out the core material. Of course, these are merely examples of the filter 7 and no limitation is intended.

As illustrated in FIG. 2, the filter housing 40 includes a peripheral wall part 41, a first restraining end part 42 disposed on one end side of the peripheral wall part 41, and a second restraining end part 43 disposed on the other end side of the peripheral wall part 41. In the axial direction of the filter housing 40, an end part on which the first restraining end part 42 is formed is called a first end 40A, and an end part on which the second restraining end part 43 is formed is called a second end 40B. The peripheral wall part 41, the first restraining end part 42, and the second restraining end part 43 in the filter housing 40 are integrally formed.

The first restraining end part 42 disposed on one end side (first end 40A side) of the peripheral wall part 41 in the filter housing 40 is formed as a closing surface. On the other hand, the second restraining end part 43 disposed on the other end side (second end 40B side) of the peripheral wall part 41 is formed as an annular flange disposed surrounding a gas inflow port 44. The gas inflow port 44 is an opening for allowing the combustion gas of the gas generating agent 62 generated in the combustion chamber housing unit 10 to flow into the filter housing 40 (filter accommodating space). In the present embodiment, the gas inflow port 44 has a circular cross section and is provided in the form of a single hole whose center is disposed coaxially with the center axis of the filter housing 40.

The peripheral wall part 41 includes small diameter parts 411 and 412 formed on both one end side and the other end side in the axial direction, and a large diameter part 413 formed between the small diameter parts 411 and 412. More specifically, annular stepped parts 414 and 415 connecting the small diameter parts 411 and 412 and the large diameter part 413 are formed between the small diameter parts 411 and 412 and the large diameter part 413.

The small diameter parts 411 and 412 have an outer diameter relatively smaller than that of the large diameter part 413, and the large diameter part 413 has an outer diameter slightly larger than that of the small diameter parts 411 and 412. In the filter housing 40, the small diameter part 412 positioned on the second end 40B side is inserted into the first end part 2A (one end) of the combustion chamber housing 2, and is fixed to the combustion chamber housing 2 in this state. In this configuration, the gas inflow port 44 faces the combustion chamber 22. Thus, by fixing the filter housing 40 (filter unit 4) to the combustion chamber housing 2 in a state where the small diameter part 412 is inserted into the first end part 2A of the combustion chamber housing 2, the amount by which the small diameter part 412 is inserted into the first end part 2A of the combustion chamber housing 2 can be adjusted in accordance with the amount of the gas generating agent 62 accommodated in the combustion chamber 22 of the combustion chamber housing unit 10. With this configuration, the volume of the combustion chamber 22 can have an appropriate size in accordance with the amount of the gas generating agent 62. Therefore, even when the gas generator 1 is mounted on an airbag device or the like and then subjected to vibration or the like, the gas generating agent 62 does not excessively move around in the combustion chamber 22, and generation of abnormal noise caused by this can be suppressed.

Note that the method for fixing the filter housing 40 to the combustion chamber housing 2 is not particularly limited. For example, the first end part 2A of the combustion chamber housing 2 and an appropriate site of the filter housing 40 may be welded (e.g., full circumference welding) in a state where the small diameter part 412 is inserted into the first end part 2A of the combustion chamber housing 2. In this case, the outer diameter of the small diameter part 412 of the filter housing 40 may be designed to be equal to or slightly smaller than the inner diameter of the first end part 2A of the combustion chamber housing 2. Alternatively, the outer diameter of the small diameter part 412 of the filter housing 40 may be designed to be slightly larger than the inner diameter of the first end part 2A of the combustion chamber housing 2, and the filter housing 40 may be fixed to the combustion chamber housing 2 by press-fitting the small diameter part 412 inside the first end part 2A via a seal member.

Furthermore, in the filter unit 4 according to the present embodiment, in a state where the small diameter part 412 of the filter housing 40 is inserted into the first end part 2A of the combustion chamber housing 2, the annular stepped part 415 connecting the small diameter part 412 and the large diameter part 413 may abut against the open end surface 2C of the first end part 2A of the combustion chamber housing 2. In this aspect, when the filter unit 4 is attached to the combustion chamber housing unit 10, this insertion work is completed at the time point when the annular stepped part 415 abuts against the open end surface 2C with the small diameter part 412 of the filter housing 40 inserted into the first end part 2A of the combustion chamber housing 2. With this configuration, the amount by which the small diameter part 412 is inserted into the filter housing 40 with respect to the combustion chamber housing 2 can be made constant at the time of attaching the filter unit 4. As a result, variation in the volume of the combustion chamber 22 for each product can be suppressed when assembling gas generators having identical specifications.

In the filter unit 4 in the present embodiment, in a state where the filter 7 is accommodated in the filter housing 40 (filter accommodating space), the small diameter parts 411 and 412 of the peripheral wall part 41 abut against an outer peripheral surface 74 of the filter 7. Due to this, the small diameter parts 411 and 412 of the peripheral wall part 41 function as a "restraining peripheral wall part" that restrains the outer peripheral surface 74 of the filter 7 in a transverse cross-sectional direction (radial direction) in the filter housing 40 (filter accommodating space). This can suppress rattling of the filter 7 in the filter housing 40 (filter accommodating space). For example, the inner diameter of the small diameter parts 411 and 412 may be slightly smaller than the outer diameter of the filter 7 in a state before the filter 7 is accommodated in the filter housing 40 (filter accommodating space) (in the original shape). With this configuration, the filter 7 can be accommodated in the filter housing 40 (filter accommodating space) in a state where the filter 7 is compressed in the transverse cross-sectional direction (radial direction) by the small diameter parts 411 and 412, whereby rattling of the filter 7 can be more suitably suppressed.

As described above, the inner diameter of the large diameter part 413 in the peripheral wall part 41 of the filter housing 40 is larger than the outer diameter of the filter 7. Therefore, as illustrated in FIG. 2, in a state where the filter 7 is accommodated in the filter housing 40 (filter accommodating space), the inner peripheral surface of the large diameter part 413 is disposed apart from the outer peripheral surface 74 of the filter 7. As a result, a gap 45 having an annular shape is formed between the outer peripheral surface 74 of the filter 7 and the inner peripheral surface of the large diameter part 413. The center axis of the gap 45 having an annular shape is coaxial with the center axis of the filter housing 40, for example.

The large diameter part 413 of the peripheral wall part 41 is provided with the gas discharge port 46 for discharging the combustion gas of the gas generating agent 62 to the outside of the filter housing 40. The filter unit 4 in the present embodiment receives the combustion gas of the gas generating agent 62 generated in the combustion chamber 22 of the combustion chamber housing unit 10 from the gas inflow port 44 disposed facing the combustion chamber 22, and guides the combustion gas to the hollow part 71 of the filter 7 accommodated in the filter housing 40 (filter accommodating space). Then, the combustion gas introduced into the hollow part 71 of the filter 7 sequentially passes through the filter 7 and the gap 45 having an annular shape, and is discharged to the outside from the gas discharge port 46 formed in the large diameter part 413 of the peripheral wall part 41. In the present embodiment, the gas discharge port 46 is disposed in the large diameter part 413 surrounding the gap 45 having an annular shape. With this configuration, the gas discharge port 46 can directly communicate with the gap 45 having an annular shape, and the combustion gas can be smoothly discharged from the gas discharge port 46.

Note that the large diameter part 413 in the peripheral wall part 41 disposed facing and apart from the outer peripheral surface 74 of the filter 7 functions as a "non-restraining peripheral wall part" that does not restrain the filter 7 in the radial direction. Aspects such as the number, position, size, shape, and arrangement pattern of the gas discharge port 46 provided in the large diameter part 413 of the peripheral wall part 41 are not particularly limited. In the present embodiment, a plurality of the gas discharge ports 46 are arranged at predetermined intervals along the circumferential direction of the large diameter part 413.

Next, axial restraint of the filter 7 accommodated in the filter housing 40 will be described. The second restraining end part 43 in the filter housing 40 is formed by an annular flange in which an end part of the peripheral wall part 41 is folded toward the filter accommodating space. An inner surface 42A of the first restraining end part 42 formed as a closing surface and an inner surface 43A of the second restraining end part 43 formed as an annular flange are arranged facing each other across the filter accommodating space. In the state where the filter 7 is accommodated in the filter housing 40 (filter accommodating space), the inner surface 42A of the first restraining end part 42 abuts against the first end surface (one axial end surface) 72 of the filter 7, and the inner surface 43A of the second restraining end part 43 abuts against the second end surface (other axial end surface) 73 of the filter 7. That is, the filter 7 is restrained in the axial direction by the first restraining end part 42 and the second restraining end part 43 sandwiching the filter 7 from both sides in the axial direction of the filter housing 40.

As a result, in the filter housing 40 (filter accommodating space), the filter 7 can be suppressed from moving in the axial direction, and rattling of the filter 7 can be suppressed. With this configuration, the occurrence of a so-called short path can be prevented. A short path is a phenomenon in which the combustion gas having flowed into the hollow part 71 of the filter 7 through the gas inflow port 44 of the filter housing 40 passes between the first end surface 72 of the filter 7 and the first restraining end part 42 or between the second end surface 73 of the filter 7 and the second restraining end part 43 and is discharged from the gas discharge port 46 (without passing through the filter 7).

Here, the separation dimension between the inner surface 42A of the first restraining end part 42 and the inner surface 43A of the second restraining end part 43 may be slightly smaller than the axial length of the filter 7 before being accommodated in the filter housing 40 (filter accommodating space). With this configuration, the filter 7 can be accommodated in the filter housing 40 (filter accommodating space) in a state where the filter 7 is compressed in the axial direction by the first restraining end part 42 and the second restraining end part 43. As a result, rattling of the filter 7 or occurrence of the short path of the combustion gas described above can be more suitably suppressed. Note that the inner surface 42A of the first restraining end part 42 in the filter housing 40 and the first end surface (one axial end surface) 72 of the filter 7 may indirectly abut against each other via a sealing material such as a gasket interposed therebetween. The inner surface 43A of the second restraining end part 43 and the second end surface (other axial end surface) 73 of the filter 7 may indirectly abut against each other via a sealing material such as a gasket interposed therebetween.

In the filter unit 4 of the present embodiment, the diameter of the gas inflow port 44 is equal to the inner diameter of the filter 7 or smaller than the inner diameter of the filter 7. Here, the inner diameter of the filter 7 is the diameter of the hollow part 71 formed in the filter 7. As a result, as illustrated in FIG. 2, the second restraining end part 43, which is an annular flange surrounding the gas inflow port 44, is brought into a state of covering the entire second end surface 73 (end surface facing the second restraining end part 43) of the filter 7. Thus, by covering the entire second end surface 73 of the filter 7 with the second restraining end part 43, it is possible to suppress direct collision of high-temperature combustion gas having a high flow rate with the second end surface 73 of the filter 7. This can suitably suppress the second end surface 73 of the filter 7 from being damaged.

During the operation of the gas generator 1, the output of the combustion gas discharged from the gas discharge port 46 of the filter unit 4 is limited to the smaller of the total opening area of the gas discharge ports 46 and the opening area of the gas inflow ports 44. The total opening area of the gas discharge ports 46 is the sum of the opening areas of the gas discharge ports 46 when a plurality of the gas discharge ports 46 are disposed in the large diameter part 413 of the peripheral wall part 41 of the filter housing 40. Here, when a plurality of the gas discharge ports 46 are disposed in the large diameter part 413 of the peripheral wall part 41, if the machining tolerances generated per one gas discharge port 46 are the same, the total machining tolerance is thought to increase as the number of gas discharge ports 46 increases. Therefore, when a plurality of the gas discharge ports 46 are disposed in the large diameter part 413 of the peripheral wall part 41, it is easier to adjust the output of the gas generator 1 by limiting the output of the gas generator 1 (i.e., the amount of gas supplied to the airbag device) by the opening area of the gas inflow port 44. Therefore, when a plurality of the gas discharge ports 46 are disposed in the large diameter part 413 of the peripheral wall part 41 in the filter housing 40, the total opening area of the plurality of gas discharge ports 46 is preferably larger than the opening area of the gas inflow port 44. This is advantageous in terms of output stability of the gas generator 1, and can suppress variation in the output.

Figure 3:
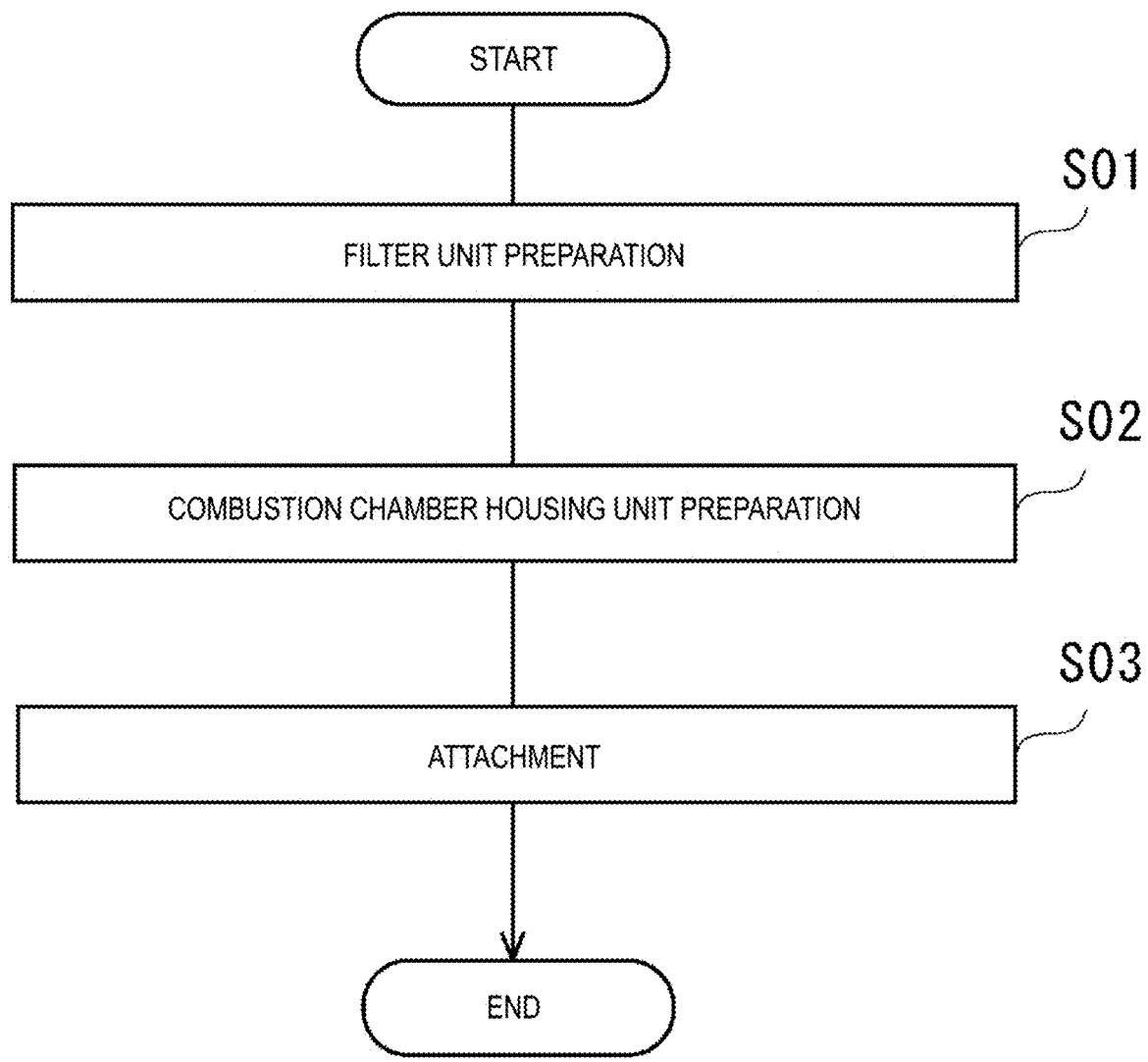
FIG. 3 is a chart illustrating a procedure of a method for manufacturing a gas generator.

Next, a method for manufacturing the gas generator 1 including the combustion chamber housing unit 10 and the filter unit 4 described above will be described. FIG. 3 is a chart illustrating the procedure of the method for manufacturing the gas generator 1. First, in step S01, the above-described filter unit 4 is prepared (filter unit preparation).

Figure 4:
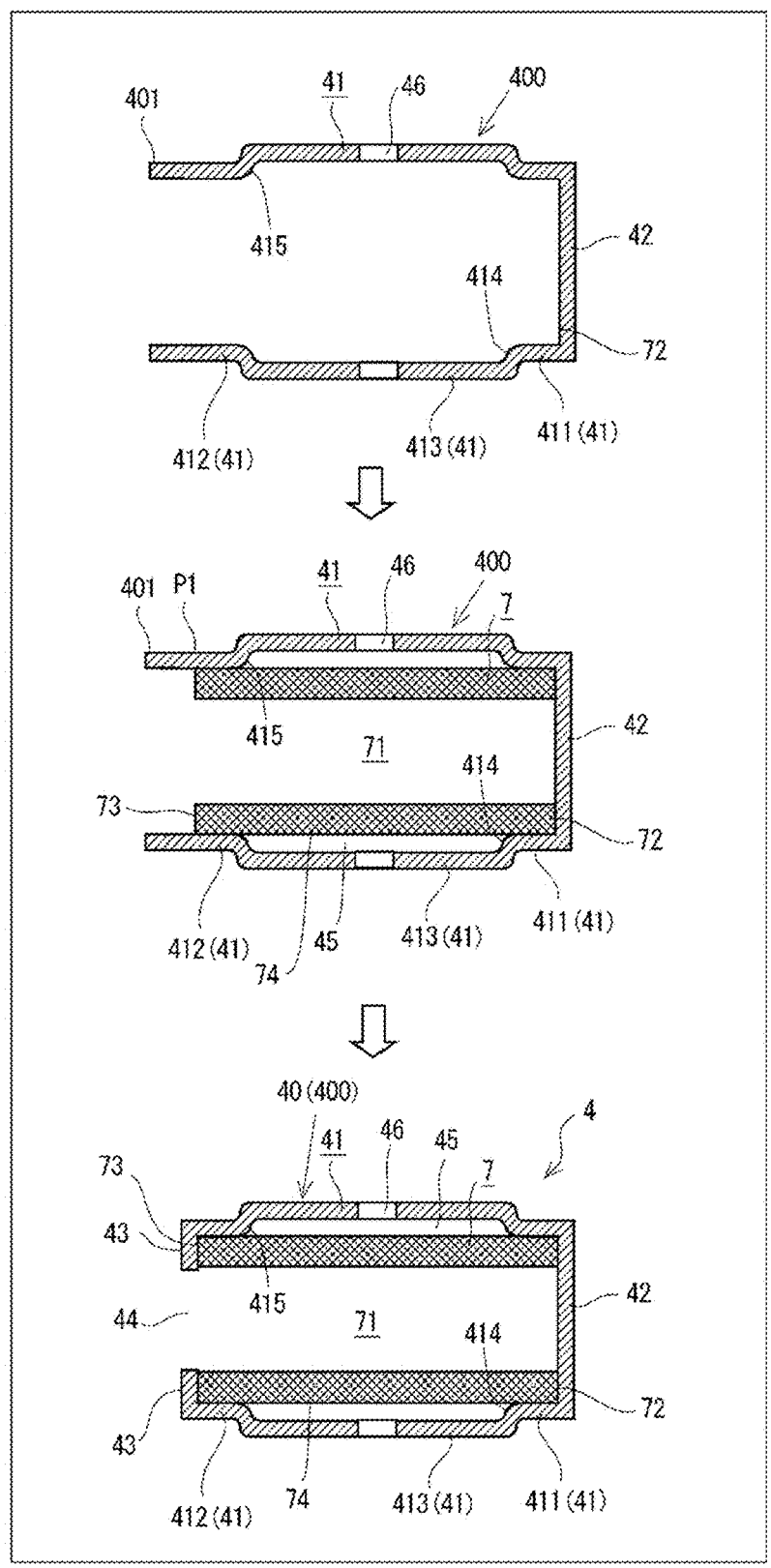
FIG. 4 is a diagram illustrating a situation of filter unit preparation.

FIG. 4 is a diagram illustrating a situation of the filter unit preparation. In the filter unit preparation, for example, as illustrated in the upper part of FIG. 4, a filter housing intermediate 400 where one end is an open end 401 is prepared. The filter housing intermediate 400 is similar to the filter housing 40 described in FIG. 2 except that the second restraining end part 43 is not folded toward the filter accommodating space. In other words, the filter housing intermediate 400 corresponds to the filter housing 40 before the second restraining end part 43 is folded.

Next, in the filter unit preparation, the filter 7 is inserted from the open end 401 side into a filter accommodating space formed inside the filter housing intermediate 400 (middle part in FIG. 4). For example, the inner diameter of each of the small diameter parts 411 and 412 of the peripheral wall part 41 in the filter housing intermediate 400 is set to a dimension slightly smaller than that of the outer diameter of the filter 7 before being accommodated in the filter accommodating space. In this case, when the filter 7 is inserted into the filter accommodating space of the filter housing intermediate 400, the filter 7 is press-fitted into each of the small diameter parts 411 and 412 of the peripheral wall part 41. Due to this, the filter 7 is compressed in the radial direction by the small diameter parts 411 and 412 (restraining peripheral wall part) of the peripheral wall part 41, and positioning of the filter 7 in the radial direction is complete. In this state, the filter 7 is fixed coaxially to the filter housing intermediate 400. The large diameter part 413 (non-restraining peripheral wall part) in the peripheral wall part 41 is disposed apart from the outer peripheral surface 74 of the filter 7, thereby forming the gap 45 having an annular shape between the large diameter part 413 and the outer peripheral surface 74.

Next, the peripheral wall of the filter housing intermediate 400 is folded inward at a specified position P1 near the open end 401. Due to this, as illustrated in the lower part of FIG. 4, the second restraining end part 43 is formed as an annular flange, and the gas inflow port 44 is formed inside an edge part of the second restraining end part 43. Here, the folding position (P1) at which the filter housing intermediate 400 is folded inward is determined and thus the inner surface 42A of the first restraining end part 42 and the inner surface 43A of the second restraining end part 43 abut against the first end surface 72 and the second end surface 73 of the filter 7, respectively. This enables the filter 7 to be positioned in the axial direction by the first restraining end part 42 and the second restraining end part 43. For example, the dimension from the folding position (P1) of the filter housing intermediate 400 to the first restraining end part 42 may be set to a dimension slightly smaller than the axial length of the filter 7. With this configuration, the filter 7 can be compressed in the axial direction by the first restraining end part 42 and the second restraining end part 43.

As described above, the preparation of the filter unit 4 is complete. In the filter unit preparation, the first end surface (one axial end surface) 72 of the filter 7 is restrained by disposing the first restraining end part 42 as a closing surface at one end of the filter housing 40, and the second end surface (other axial end surface) 73 of the filter 7 is restrained by disposing the second restraining end part 43 at the other end of the filter housing 40, thereby surrounding the gas inflow port 44. The large diameter part 413 (non-restraining peripheral wall part) in the peripheral wall part 41 of the filter housing 40 is disposed apart from the outer peripheral surface 74 of the filter 7 thereby forming the gap 45 having an annular shape between the large diameter part 413 and the outer peripheral surface 74. Additionally, the outer peripheral surface 74 of the filter 7 is restrained by the small diameter parts 411 and 412 (restraining peripheral wall part). Note that when preparing the filter housing intermediate 400 in step S01, it is possible to prepare the filter housing intermediate 400 in which the small diameter part 412 on the open end 401 side does not exist, form the small diameter part 412 after inserting the filter 7 into the filter accommodating space, and further form the second restraining end part 43.

In step S02 of FIG. 3, a combustion chamber housing unit having a tubular shape in which the combustion chamber 22 accommodating the gas generating agent 62 is formed is prepared (combustion chamber housing unit preparation). Here, the combustion chamber housing unit may be the combustion chamber housing unit 10 before the igniter 3 is attached, for example. Of course, the procedure illustrated in FIG. 3 is an example, and the order of the filter unit preparation and the combustion chamber housing unit preparation is not particularly limited, and the order of them may be exchanged as appropriate.

Figure 5:
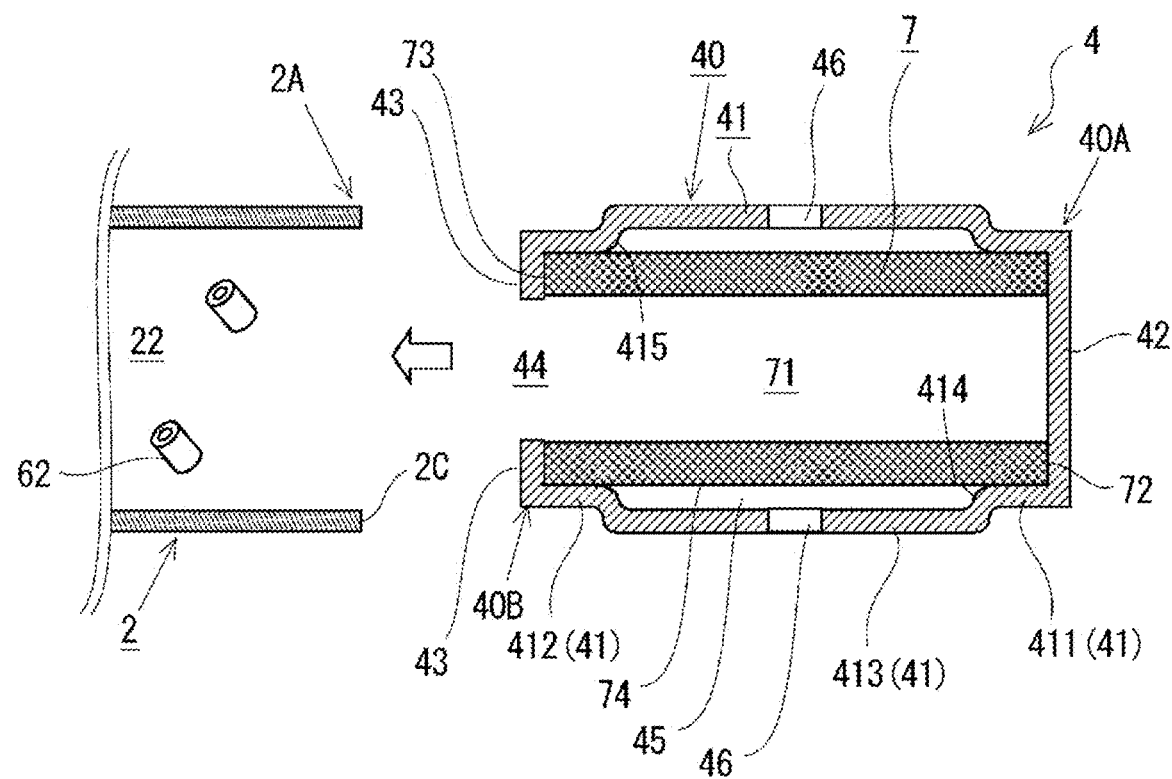
FIG. 5 is a diagram illustrating a situation of attachment.

Next, in step S03, the filter unit 4 is attached to the first end part 2A (one end) of the combustion chamber housing 2 (attachment). FIG. 5 is a diagram illustrating a situation of the attachment. In the attachment, the small diameter part 412 of the filter housing 40 is inserted into the first end part 2A of the combustion chamber housing 2 until the annular stepped part 415 of the filter housing 40 in the filter unit 4 abuts against the open end surface 2C of the combustion chamber housing 2, and the filter housing 40 is fixed to the combustion chamber housing 2 in this state. The fixing of the filter housing 40 to the combustion chamber housing 2 may be achieved by welding as described above, or may be achieved by press-fitting the small diameter part 412 into the first end part 2A via a seal member. After the attachment is complete, the gas generator 1 described with reference to FIGS. 1 and 2 is completed by attaching the igniter 3 to the second end part 2B of the combustion chamber housing 2, for example. Note that the above-described method for manufacturing the gas generator 1 is an example, and each process may be interchanged as necessary or another process may be added. For example, in the combustion chamber housing unit preparation in the above example, the combustion chamber housing unit before the igniter 3 is attached is prepared, the filter unit 4 is attached to the combustion chamber housing unit, and the igniter 3 is attached subsequently, but the method for manufacturing the gas generator 1 is not limited to this. In some cases, the combustion chamber housing unit 10 after the igniter 3 is attached may be prepared, and the filter unit 4 may be attached to the combustion chamber housing unit 10 in the attachment.

As described above, the filter unit 4 according to the present embodiment is configured as a unit structure in which the filter 7 is accommodated in a coaxially positioned and fixed state with respect to the filter housing 40. The filter unit 4 enables the filter 7 to be fixed to the filter housing 40 in a state where the filter 7 is restrained from both the axial direction and the transverse cross-sectional direction (radial direction). With this configuration, the filter 7 can be positioned and fixed without rattling in the filter housing 40 (filter accommodating space). Thus, by unitizing the filter 7 and the filter housing 40, the filter 7 and the filter housing 40 are not separated even when subjected to an impact from the outside, and handling becomes easy. Hence, in the manufacturing process of the gas generator 1, the filter 7 does not fall off from the filter housing 40, and ease of handling as a component is excellent. Therefore, it is possible to provide the filter unit 4 suitable for manufacturing the gas generator 1. Since the filter 7 can be fixed without rattling inside the filter housing 40, it is also possible to suppress generation of abnormal noise caused by vibration from the outside.

In the filter unit 4 according to the present embodiment, the small diameter parts 411 and 412 serving as the restraining peripheral wall part are disposed on both the first end 40A side and the second end 40B side of the peripheral wall part 41 in the filter housing 40. This enables the outer peripheral surface 74 of the filter 7 to be more stably positioned and fixed in the transverse cross-sectional direction (radial direction). However, the arrangement of the restraining peripheral wall part in the filter housing 40 is not limited to this. For example, the small diameter part 411 (412) may be disposed on only any one of the first end 40A side and the second end 40B side in the peripheral wall part 41, and the other area in the peripheral wall part 41 may be the large diameter part 413.

In the filter unit 4 according to the present embodiment, it is preferable that the gas discharge port 46 or the gas inflow port 44 be closed airtightly by a sealing member such as a sealing tape from the viewpoint of suppressing external moisture from entering the combustion chamber 22 when attached to the combustion chamber housing unit 10.

Note that when closing the gas discharge port 46 with a sealing member such as a sealing tape, in a case where the peripheral wall part 41 is provided with a plurality of the gas discharge ports 46, it is necessary to close each of the plurality of gas discharge ports 46 with the sealing member. On the other hand, closing the gas inflow port 44 with the sealing member is advantageous in that closing only the single gas inflow port 44 is sufficient. When each of the plurality of gas discharge ports 46 is closed with the sealing member, due to the machining tolerance of each of the gas discharge ports 46, a difference is generated in rupture pressure at which the sealing member ruptures during the operation of the gas generator 1, and the gas discharge port 46 open to the outside and the gas discharge port 46 maintained in a closed state may both be generated. In a case where the gas discharge port 46 is closed with the sealing member from the outside, there is a risk that the sealing member may become damaged when something comes into contact with the sealing member. In consideration of these points, it is more preferable to close the gas inflow port 44 of the filter unit 4 with the sealing member than to close the gas discharge port 46 with the sealing member.

When the gas generating agent 62 accommodated in the combustion chamber 22 of the combustion chamber housing unit 10 has a solid shape such as a pellet shape and the size per particle is smaller than the opening area of the gas inflow port 44, it is preferable to install, at the second restraining end part 43 of the filter housing 40, a movement suppressing member for suppressing the gas generating agent 62 from moving from the combustion chamber 22 side into the filter housing 40 (filter accommodating space). As this movement suppressing member, a perforated member having a large number of holes can be used.

Here, in a case where both the sealing member (e.g., a sealing tape) for closing the gas inflow port 44 of the filter unit 4 and the perforated member for suppressing entry of the gas generating agent 62 into the filter housing 40 (filter accommodating space) from the combustion chamber 22 side are attached to the second restraining end part 43, when the perforated member is in contact with the sealing member, the rupture pressure of the sealing member may be affected. Therefore, in such case, it is preferable to dispose the sealing member and the perforated member separately from each other.

Figure 6:
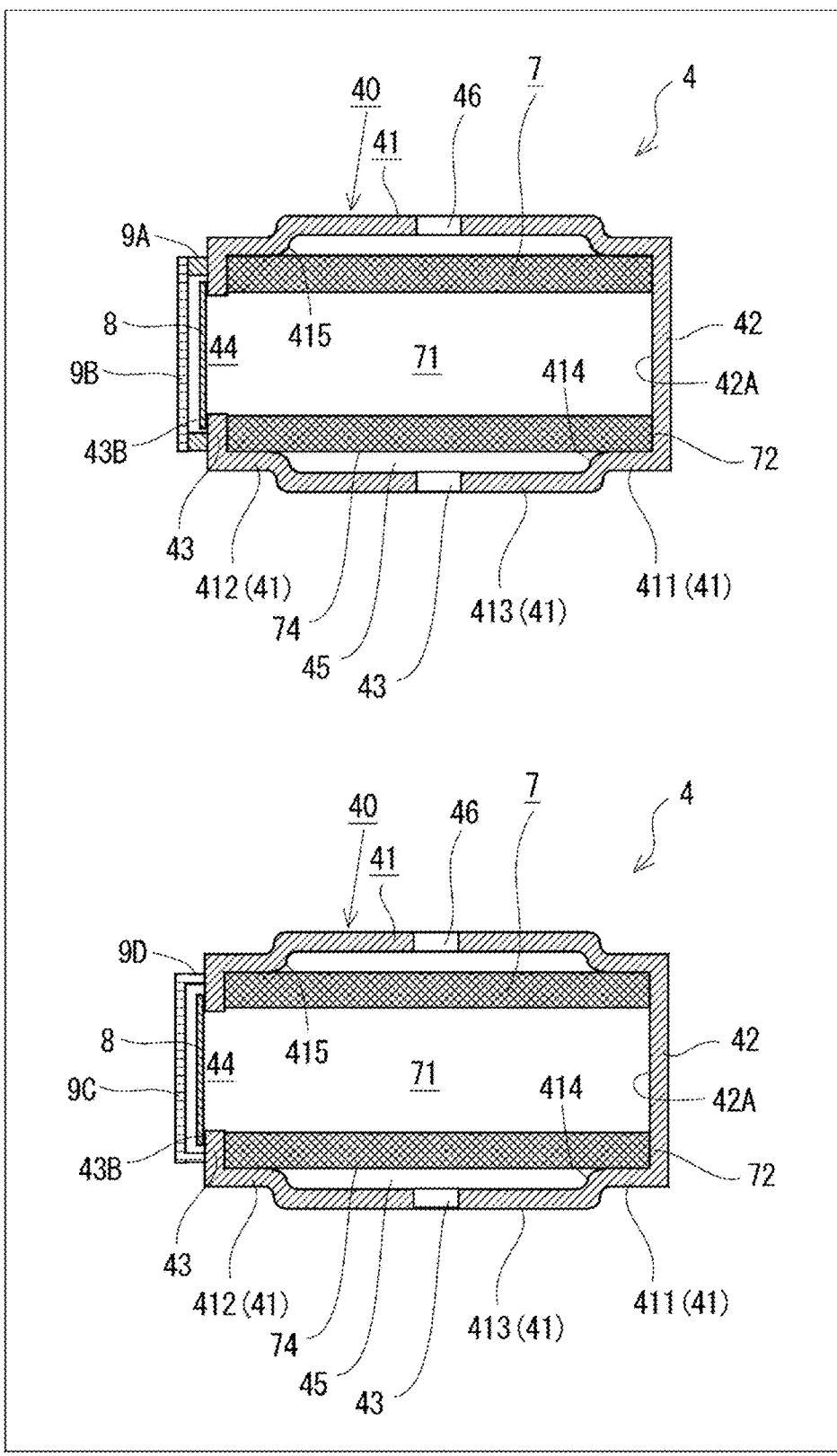
FIG. 6 is a diagram illustrating an installation example of a sealing member and a perforated member installed at a second restraining end part of a filter housing.

FIG. 6 is a diagram illustrating an installation example of the sealing member and the perforated member installed at the second restraining end part 43 of the filter housing 40. In the installation example illustrated in the upper part of FIG. 6, a sealing tape 8 serving as a sealing member is put to an outer surface 43B of the second restraining end part 43 in the filter housing 40. A spacer 9A having an annular shape, for example, is attached to the outer surface 43B of the second restraining end part 43, and a perforated member 9B is attached to the spacer 9A. In this installation example, by interposing the spacer 9A between the outer surface 43B of the second restraining end part 43 and the perforated member 9B, the perforated member 9B and the sealing tape 8 are separated from each other, which helps prevent the perforated member 9B and the sealing tape 8 from coming into contact with each other.

In the installation example illustrated in the lower part of FIG. 6, a perforated member 9C having a shallow bottom cup shape is attached to the outer surface 43B of the second restraining end part 43. The perforated member 9C includes a spacer part 9D, and the perforated member 9C and the sealing tape 8 are separated from each other by attaching the spacer part 9D to the outer surface 43B of the second restraining end part 43.

While an embodiment of the present disclosure has been described above, each aspect disclosed in the present description can be combined with any other features disclosed in the present description.

REFERENCE SIGNS LIST

1 Gas generator
2 Combustion chamber housing
3 Igniter
5 Partition wall
6 Gas generating agent
7: Filter
10 Combustion chamber housing unit
40 Filter housing
41 Peripheral wall part
42 First restraining end part
43 Second restraining end part
44 Gas inflow port
45 Gap
46 Gas discharge port

The invention claimed is:

1. A filter unit for a gas generator, the filter unit comprising:
a filter having a columnar outer shape; and
a filter housing accommodating the filter in a filter accommodating space formed inside the filter housing, the filter being accommodated in a coaxially positioned and fixed state, wherein
the filter housing includes
a first restraining end part disposed as a closing surface at one end of the filter housing and restraining a one axial end surface of the filter,
a second restraining end part disposed at an other end of the filter housing, surrounding a gas inflow port, and restraining an other axial end surface of the filter, and
a peripheral wall part connecting the first restraining end part and the second restraining end part and including a gas discharge port, the first restraining end part, the second restraining end part, and the peripheral wall part being integrally formed, and
the peripheral wall part includes
a restraining peripheral wall part restraining a peripheral surface of the filter, and
a non-restraining peripheral wall part in which the gas discharge port is disposed, the non-restraining peripheral wall part being disposed apart from the peripheral surface of the filter thereby forming an annular gap between the non-restraining peripheral wall part and the peripheral surface of the filter,
wherein the restraining peripheral wall part is parallel to the non-restraining peripheral wall part, and an annular stepped part connects the restraining peripheral wall part and the non-restraining peripheral wall part.

2. The filter unit for a gas generator according to claim 1, wherein
the second restraining end part is formed by an annular flange in which an end part of the peripheral wall part is folded toward the filter accommodating space.

3. The filter unit for a gas generator according to claim 1, wherein
the peripheral wall part includes a small diameter part, and a large diameter part having an outer diameter larger than an outer dimeter of the small diameter part, and
the restraining peripheral wall part is formed by the small diameter part, and the non-restraining peripheral wall part is formed by the large diameter part.

4. The filter unit for a gas generator according to claim 1, wherein
the restraining peripheral wall part is formed on both of one end side and an other end side of the peripheral wall part in an axial direction of the peripheral wall part, and
the non-restraining peripheral wall part is formed between a pair of the restraining peripheral wall parts.

5. The filter unit for a gas generator according to claim 1, wherein
the filter has a cylindrical shape in which a hollow part is formed along an axial direction, and
the second restraining end part covers an entirety of an end surface of the filter.

6. The filter unit for a gas generator according to claim 5, wherein
the filter has a cylindrical shape in which a hollow part is formed along an axial direction, and
a diameter of the gas inflow port is equal to an inner diameter of the filter or smaller than the inner diameter of the filter.

7. The filter unit for a gas generator according to claim 1, wherein
a plurality of the gas discharge ports are formed in the peripheral wall part, and
a total opening area of the plurality of gas discharge ports is larger than an opening area of the gas inflow port.

8. A gas generator, comprising:
a combustion chamber housing unit including a combustion chamber housing having a tubular shape in which a combustion chamber accommodating a gas generating agent is formed, and an igniter attached to the combustion chamber housing; and
the filter unit for a gas generator according to claim 1, attached to one end of the combustion chamber housing, wherein
the gas inflow port of the filter housing is disposed facing the combustion chamber.

9. A gas generator, comprising:
a combustion chamber housing unit including a combustion chamber housing having a tubular shape in which a combustion chamber accommodating a gas generating agent is formed, and an igniter attached to the combustion chamber housing; and
the filter unit for a gas generator according to claim 3, attached to one end of the combustion chamber housing, wherein
the filter housing includes the annular stepped part between the small diameter part and the large diameter part, and
in the filter housing, the small diameter part is inserted into one end of the combustion chamber housing with the gas inflow port facing the combustion chamber, and the annular stepped part abuts against an open end surface on one end side of the combustion chamber housing.

10. A method for manufacturing a gas generator, the method comprising:
preparing a filter unit for a gas generator, the filter unit including a filter having a columnar outer shape, and a filter housing accommodating the filter in a filter accommodating space formed inside the filter housing, the filter being accommodated in a coaxially positioned and fixed state;
preparing a combustion chamber housing unit including a combustion chamber housing having a tubular shape in which a combustion chamber accommodating a gas generating agent is formed; and
attaching the filter unit for a gas generator to one end of the combustion chamber housing, wherein
the filter housing includes a first restraining end part, a second restraining end part, and a peripheral wall part connecting the first restraining end part and the second restraining end part, the first restraining end part, the second restraining end part, and the peripheral wall part being integrally formed,
the peripheral wall part includes a non-restraining peripheral wall part in which a gas discharge port is disposed, and a restraining peripheral wall part restraining a peripheral surface of the filter, and
when the filter unit for a gas generator is prepared, a one axial end surface of the filter is restrained by disposing the first restraining end part as a closing surface at one end of the filter housing, an other axial end surface of the filter is restrained by disposing the second restraining end part at an other end of the filter housing, surrounding a gas inflow port, the non-restraining peripheral wall part is disposed apart from the peripheral surface of the filter thereby forming an annular gap between the non-restraining peripheral wall part and the peripheral surface of the filter, and the peripheral surface of the filter is restrained by the restraining peripheral wall part, and
wherein the restraining peripheral wall part is parallel to the non-restraining peripheral wall part, and an annular stepped part connects the restraining peripheral wall part and the non-restraining peripheral wall part.

* * * * *